United States Patent [19]

Shimizu

[11] Patent Number: 5,589,906
[45] Date of Patent: Dec. 31, 1996

[54] APERTURE DEVICE FOR A CAMERA

[75] Inventor: Hitoshi Shimizu, Tokyo, Japan

[73] Assignee: Asahi Kogaku Kogyo Kabushiki Kaisha, Tokyo, Japan

[21] Appl. No.: 516,556

[22] Filed: Aug. 18, 1995

[30] Foreign Application Priority Data

Aug. 25, 1994 [JP] Japan .................................. 6-222750

[51] Int. Cl.⁶ ........................................................ G03B 9/02
[52] U.S. Cl. .............................................. 396/505; 396/510
[58] Field of Search ............................... 354/241, 270, 354/271.1; 359/894; 33/251; 348/362, 363

[56] References Cited

U.S. PATENT DOCUMENTS 2,481,660  9/1949  Harrison ................................. 354/270
3,456,351  7/1969  Gehmann ............................... 354/270
4,774,537  9/1988  Moody ................................ 354/271.1
4,897,681  1/1990  Yamamoto et al. ................. 354/271.1
5,099,334  3/1992  Ogata et al. ............................. 348/362

Primary Examiner—Howard B. Blankenship
Assistant Examiner—Eddie C. Lee
Attorney, Agent, or Firm—Greenblum & Bernstein P.L.C.

[57] ABSTRACT

A light-controlling variable aperture incorporates a resilient opaque tube positioned along the optical axis. When the resilient opaque tube is twisted, a constricting circular aperture forms a circular iris in an intermediate portion thereof. The circular iris is constricted to various sizes according to the degree of twisting of the tube to control the amount of light passing therethrough.

21 Claims, 9 Drawing Sheets

FIG. I
PRIOR ART
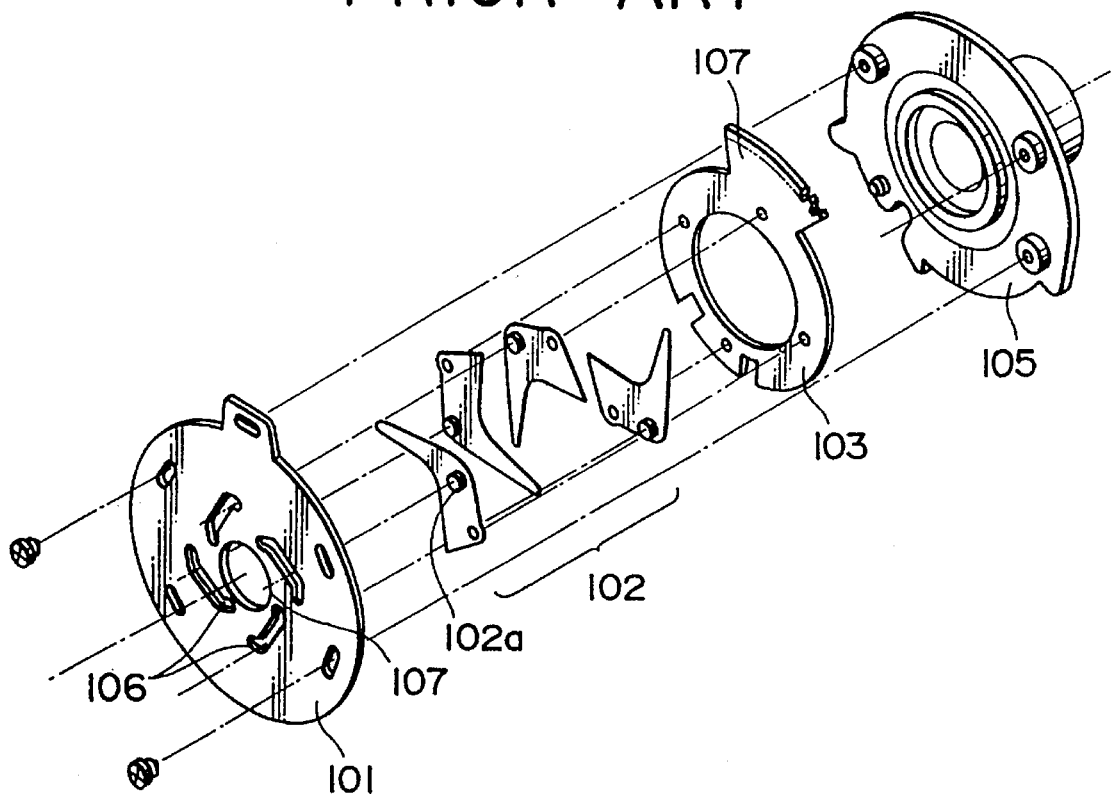
FIG. 2
PRIOR ART
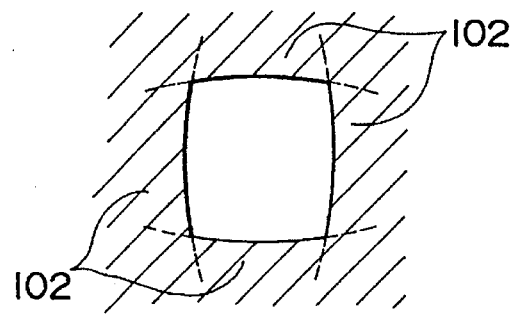

F I G. 9(a)
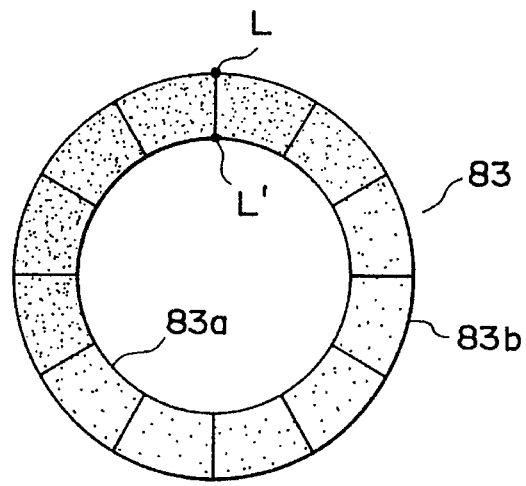
F I G. 9(b)
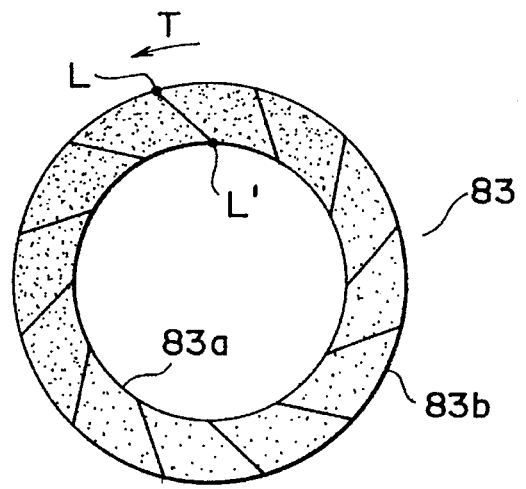
F I G. 9(c)
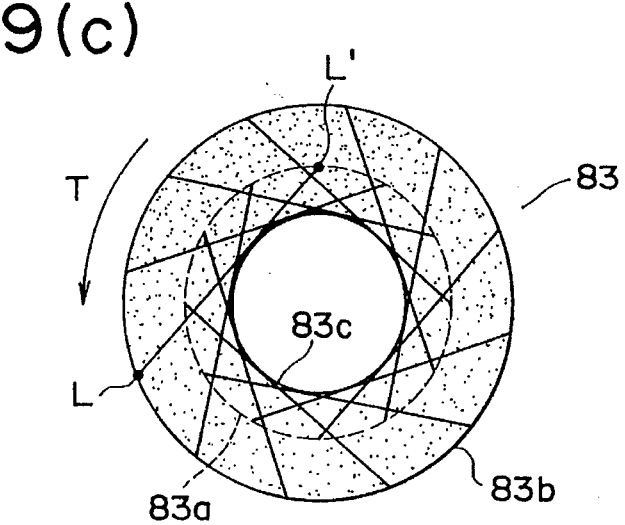

APERTURE DEVICE FOR A CAMERA

BACKGROUND OF THE INVENTION

The invention relates to an aperture device for a camera (for example, a video camera) that defines an aperture opening through which light can pass.

A conventional iris diaphragm aperture device uses several shutter blades for defining a variable aperture. FIG. 1 shows an example of a conventional iris diaphragm aperture device. As shown in FIG. 1, the conventional iris diaphragm comprises a cam disk 101, four aperture blades 102, a driving ring 103 rotatable about the cam disk 101, and a lens frame 105 for supporting the cam disk 101.

The cam disk 101 is fixed to the lens frame 105, and has an opening 107 for allowing light to pass therethrough. Four cam grooves 106 surround the opening 107. The driving ring 103 is provided between the cam ring 101 and the lens frame 105. The aperture blades 102 are pivoted about respective axes, and rotatably supported by the driving ring 103. Each aperture blade 102 has a cam follower 102a that engages a corresponding cam groove 106 formed on the cam disk 101. The driving ring 103 has a peripheral gear portion 107, which engages a drive gear (not shown) of an aperture driving mechanism. When the driving ring 103 rotates, the cam followers 102a move along the cam grooves 106 and the four blades 102 are rotated about their pivots. Consequently, the pivoted blades 102 swing, varying the position of the overlapping blades 102 and defining an aperture in the center of the iris diaphragm. Thus, the aperture opening is set, as shown in FIG. 2.

However, since the conventional iris diaphragm aperture device needs a multiplicity of shutter blades, a cam disk, and a driving disk, as well as supports for each, the number of parts is quite high. Furthermore, since the shutter blades are made of thin metal or plastic plate, operations to mount the shutter blades to the driving ring and to engage the cam followers to the cam grooves are complicated.

Still further, as shown in FIG. 3, especially in the case of point light sources, when the lens is focused to a certain point (point B in FIG. 3), then images representing other points having different distances from the lens (for example, points A, A', C and C' in FIG. 3) become indistinct, creating unsharp patches (patches a, a', c, and c'). As shown in FIG. 3, the shapes of the unsharp patches a, a', c, and c' are polygonal, being the same as that of the aperture opening (a hexagonal aperture is shown in FIG. 3). Accordingly, if a conventional aperture device having several shutter blades is used, then any unsharp patches have a polygonal shape, which can be seen as defects in the image. In order to change the share of the unsharp patches to circular, an aperture opening of circular shape is necessary. However, for a conventional iris diaphragm, circular opening would require an impracticably high number of shutter blades. If implemented, the number of parts becomes unacceptably high, and the assembling operation becomes unacceptably complicated.

SUMMARY OF THE INVENTION

Therefore, an object of the invention is to provide an improved variable aperture device having few operating parts and a simple assembly. Another object of the invention is to provide a improved variable aperture device having a circular aperture opening.

To achieve the objects of the invention, an improved aperture device for defining an aperture through which light can pass along an optical axis includes a resilient opaque tube supported coaxially with the optical axis. A mechanism constricts an intermediate portion of the resilient opaque tube to form a circular aperture for controlling the amount of the light passing through the resilient opaque tube. In this manner, light sources out of the depth of field of a particular aperture setting cast circular patches of light rather than polygonal patches by virtue of the circular aperture, enhancing the quality of images formed by light passing through the improved aperture device. Furthermore, the single resilient opaque tube can replace a multitude of parts previously required to provide a variable aperture for controlling an amount of light passing therethrough.

In one preferred embodiment, the aperture device includes a mechanism for supporting front and rear rims of the resilient opaque tube. A mechanism twists the resilient opaque tube to form and to constrict a circular iris between the front and rear rims of the resilient opaque tube. This constriction via twisting provides a reliable, repeatable, and simple operation, while the front and rear rims of the opaque tube are securely supported.

In a particular case, the supporting mechanism includes a first ring member secured to either the front or rear rim of the resilient opaque tube and a second ring member secured to the other of the front and rear rims of the resilient tube. The first and second ring member are arranged to rotate with respect to each other. Thus, the ring members, rotatable relative to each other, provide an easily controlled manner of twisting the resilient opaque tube.

Preferably, the first ring member is a non-rotatable ring member, and the second ring member is a rotatable ring member, rotatably supported and secured to the remaining one of the front and rear rims of the resilient tube. The second ring is arranged to rotate with respect to the non-rotatable ring member. Rotating only one of the rings with respect to the other allows the remaining ring to be secured to a lens frame or other support. In one particular case, the rotatable ring member is concentrically mounted with respect to the fixed ring member. If concentrically mounted, the fixed ring can be used to support the rotatable ring member, further reducing the number of parts, and improving the assembly. In this case, the rotatable ring member may be slidable about the fixed ring member.

The invention can be arranged such that a relative rotational angle of the first ring member with respect to the second ring member is varied between a first and a second predetermined angle. In this case, the first predetermined angle defines a constricted circular iris corresponding to a largest circular aperture, the second predetermined angle defines a fully constricted iris corresponding to a fully closed aperture. Thus, the circular iris can be well controlled to maintain its shape, starting from a predetermined angular position and an established size, to a fully constricted position.

In a particularly advantageous application of the invention, the unstretched axial length of the resilient opaque tube is longer than a distance between the first and second ring members when the resilient opaque tube is in an untwisted state. In this manner, the resilient opaque tube can be arranged such that it does not begin to stretch until the constricting iris is formed, thereby placing the resilient material of the tube under less static and dynamic stretching loads.

In another development of the invention, the front and rear rims have different diameter. In this case, the front rim may be of larger diameter than the second rim. According to this development, the control of the twisting of the tube via external members is more easily accomplished, and the tube suits the internal arrangements of lens systems particularly well, allowing the saving of internal space and assembly parts.

According to another aspect of the invention, a lens unit through which light can pass along an optical axis includes a lens frame having at least one lens. A resilient opaque tube forms and constricts a circular iris along the optical axis. A non-rotatable ring is provided to the lens frame to secure and support a rear rim of the resilient opaque tube. A rotatable ring, rotatably supported concentrically with the non-rotatable ring, secures and supports a front rim of the resilient opaque tube. A mechanism rotates the rotatable ring, thereby twisting resilient opaque tube to form and to constrict the circular iris between the front and rear rims of the resilient opaque tube to define a circular aperture, wherein the circular iris controls the amount of the light passing through the resilient opaque tube.

Thus, the lens unit includes an easily controlled and simple aperture device that creates a circular aperture. The advantages of the aperture device incorporating the resilient opaque tube are thereby provided in a lens unit assembly.

DESCRIPTION OF THE ACCOMPANYING DRAWINGS

FIG. 1 is a exploded perspective view of the conventional aperture device;

FIG. 2 is a schematic view of the conventional aperture opening;

Figure 8A:
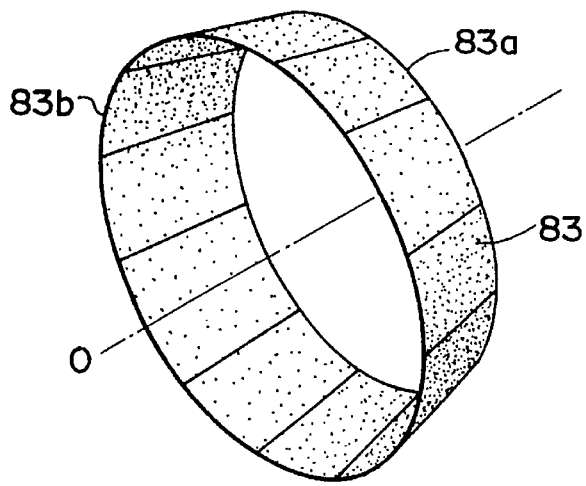
Figure 8B:
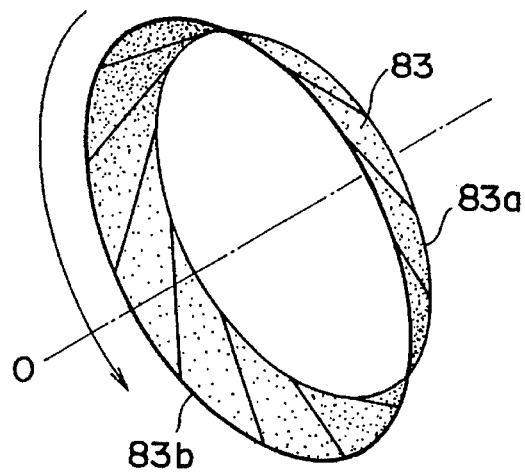
Figure 8C:
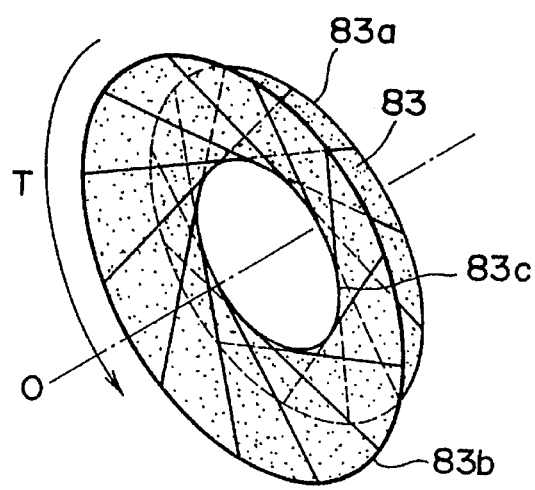
Figure 10A:
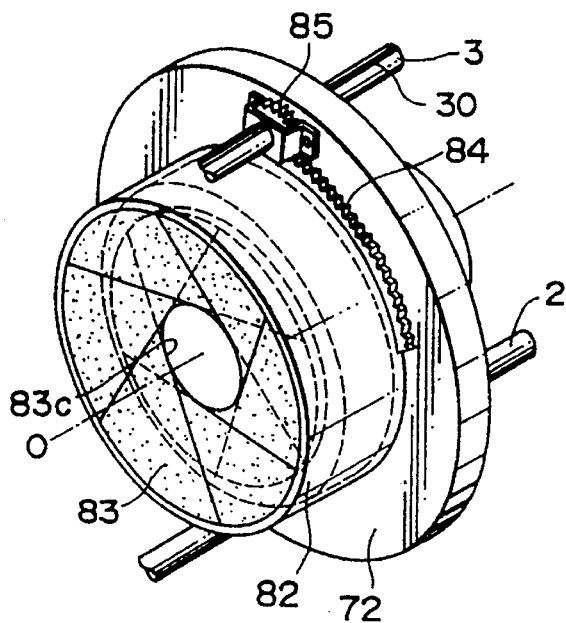
Figure 10B:
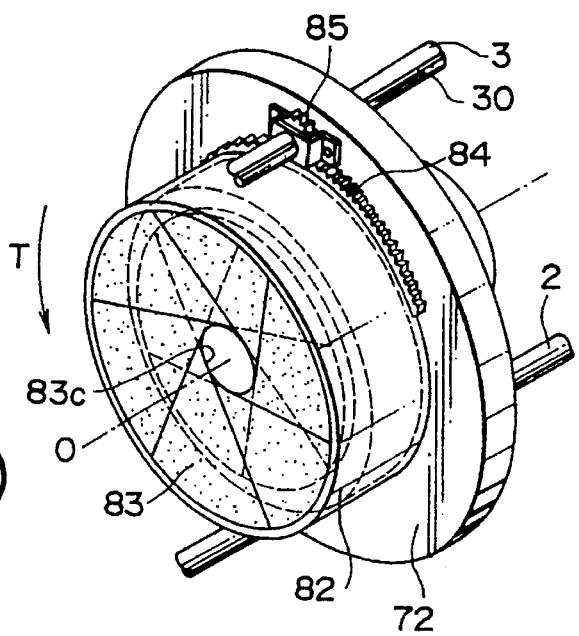
Figure 10C:
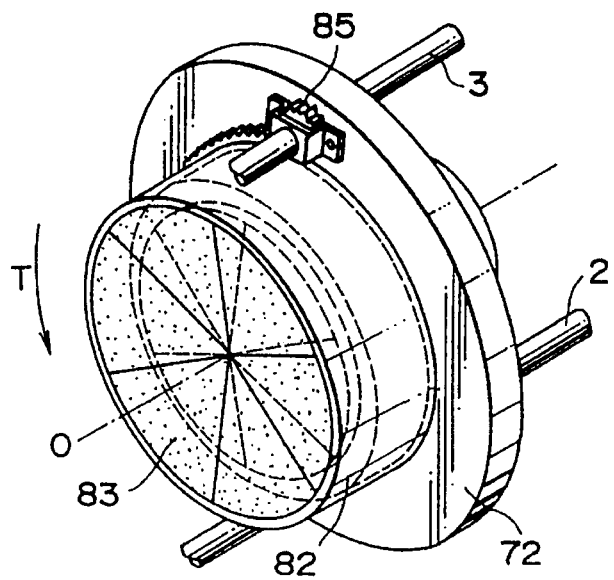
Figure 11A:
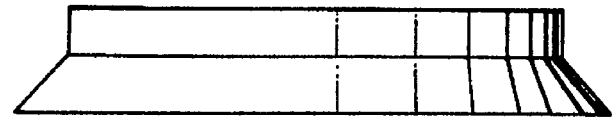
Figure 11B:
Figure 11C:

FIGS. 8(a) through 8(c) are perspective schematic views showing the aperture operation of a resilient opaque tube of the invention;

FIGS. 9(a) through 9(c) are front schematic views showing the aperture operation of the resilient opaque tube of the invention;

FIGS. 10(a) through 10(c) are perspective views showing the operation of one embodiment of the first lens according to the invention; and FIGS. 11(a) through 11(c) are side views showing different possible shapes of the resilient opaque tube according to the invention.

DESCRIPTION OF THE EMBODIMENT

Figure 3:
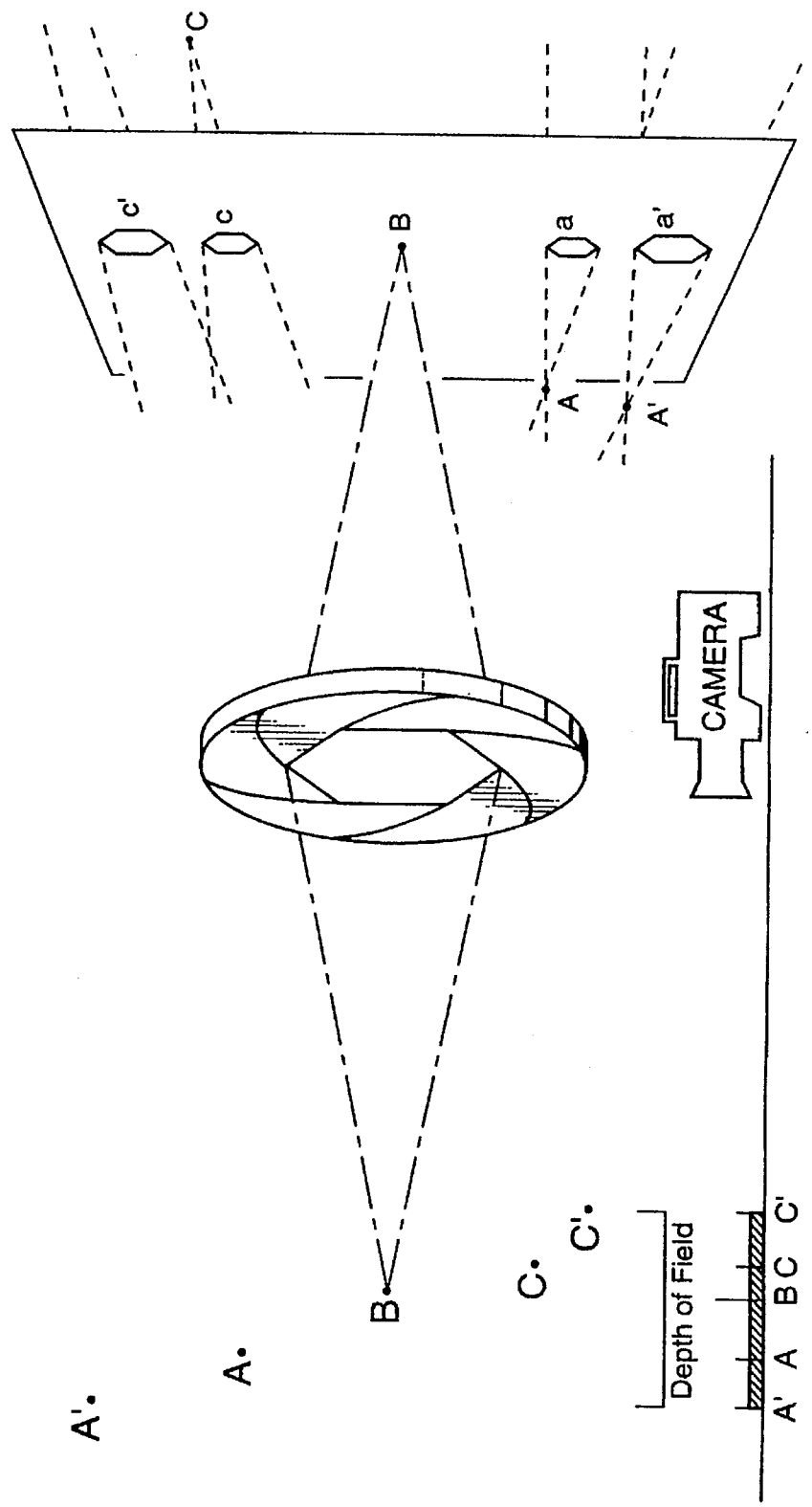
FIG. 3 is a schematic view of the unsharp patches created by a conventional aperture device.
Figure 4:
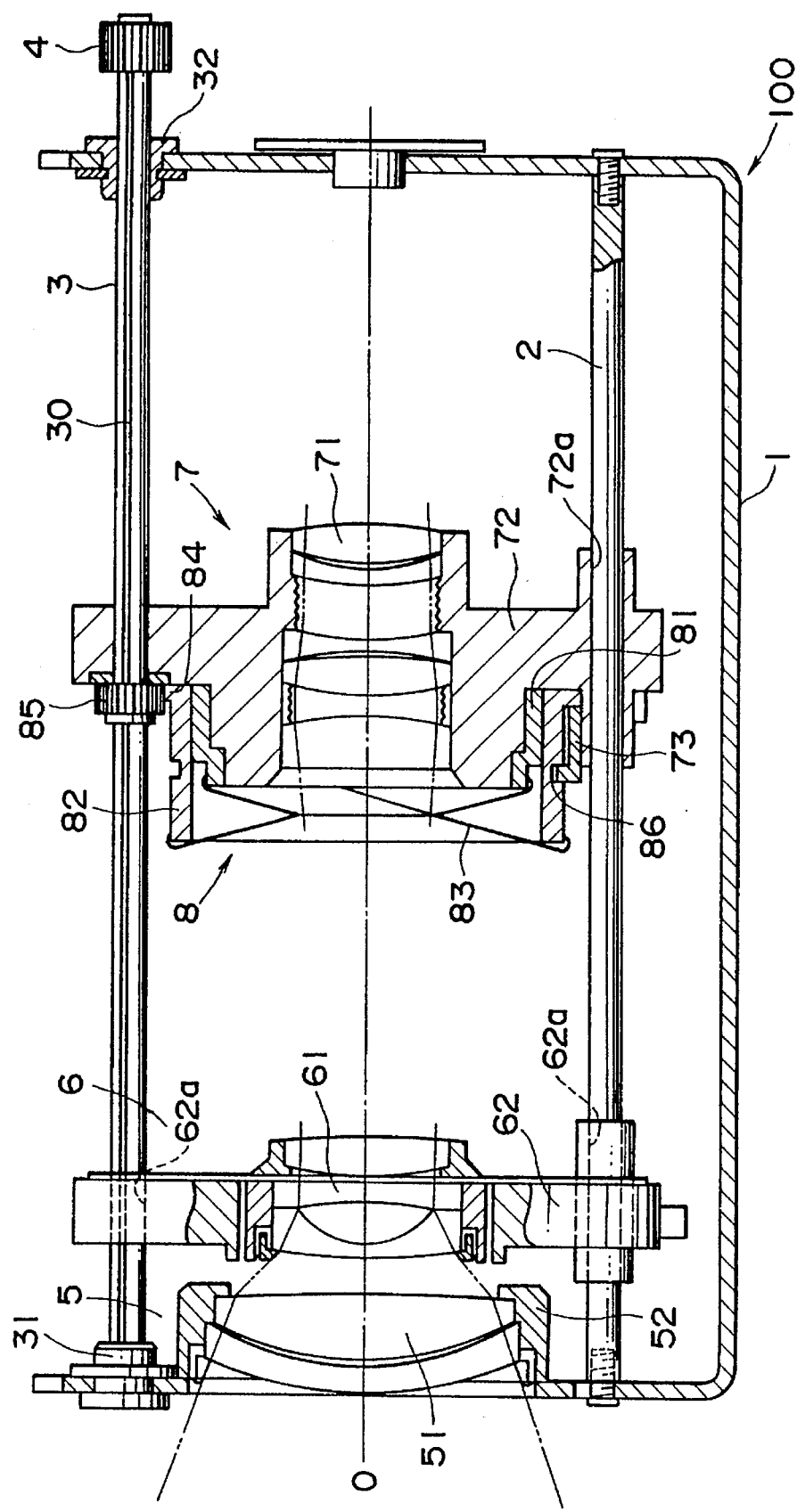
FIG. 4 is a sectional view of an embodiment of an aperture device applied to an optical system of a video camera.

The embodiment of the invention is described in accordance with accompanying drawings. FIG. 4 is a sectional view of the embodiment of the aperture device applied to an optical system 100 of a video camera.

As shown in FIG. 4, the optical system 100 has a main frame 1 in which a fixed lens unit 5, a first movable lens unit 6, and a second movable lens unit 7 are placed along an optical axis O. The fixed lens unit 5 has an objective lens group 51 mounted in a lens frame 52, and the lens frame 52 is fixed to the main frame 1. The first movable lens unit 6 includes a first movable lens group 61 mounted in a first movable lens frame 62. Similarly, the second movable lens unit 7 includes a second movable lens group 71 mounted in a second movable lens frame 72. A variable aperture device 8 is provided to the second movable lens unit 7, for defining an opening through which light from the first movable lens unit 6 can pass.

The main frame 1 has a guide shaft 2 and a guiding axis 3 arranged in parallel to the optical axis O. The guide shaft 2 is fixed to the frame 1, while the guiding axis 3 is rotatably supported by the frame 1 via bearings 31 and 32. The guiding axis 3 has an axial groove 30 in its surface for supporting and driving an aperture driving gear 85 (described later). The guiding axis 3 further includes a driven gear 4 fixed at one end.

The first movable lens frame 62 has guide bores 62a, 62b formed therein at top and bottom side. The top and bottom guide bores 62a, 62b are penetrated by the guide shaft 2 and the guiding axis 3, respectively. As a result, the first movable lens frame 62 is slidable along the guide shaft 2 and guiding axis 3 in the direction of the optical axis O. Furthermore, the second movable lens frame 72 is similarly provided with top and bottom guide bores 72a and 72b penetrated by the guide shaft 2 and guiding axis 3, and is thereby similarly slidable in the direction of the optical axis O. The first and second movable lens unit 6 and 7 are slidable along the guide shaft 2 and the guiding axis 3 by a conventional zooming mechanism (not shown).

Figure 5:
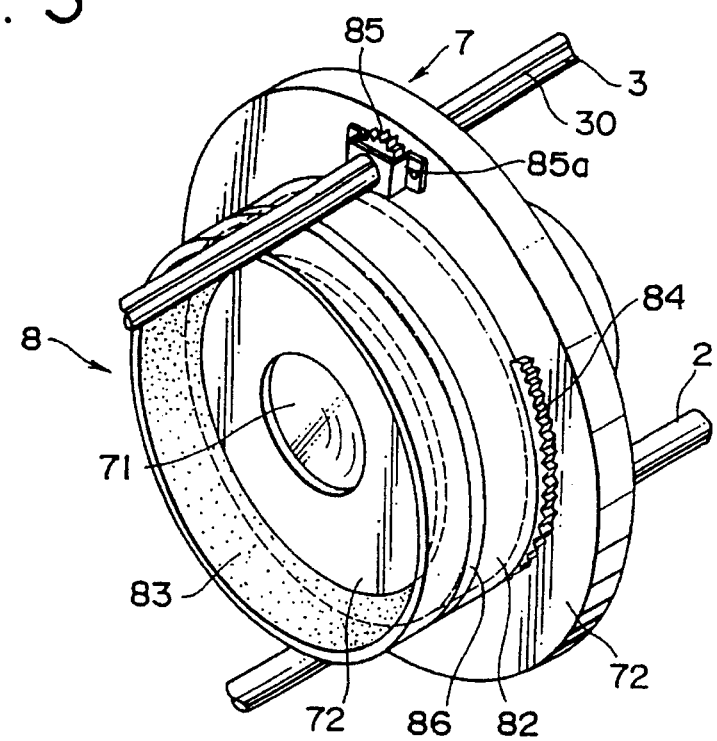
FIG. 5 is a perspective untwisted mid-assembly view of the first movable lens unit provided with the aperture device according to one embodiment of the invention.
Figure 6:
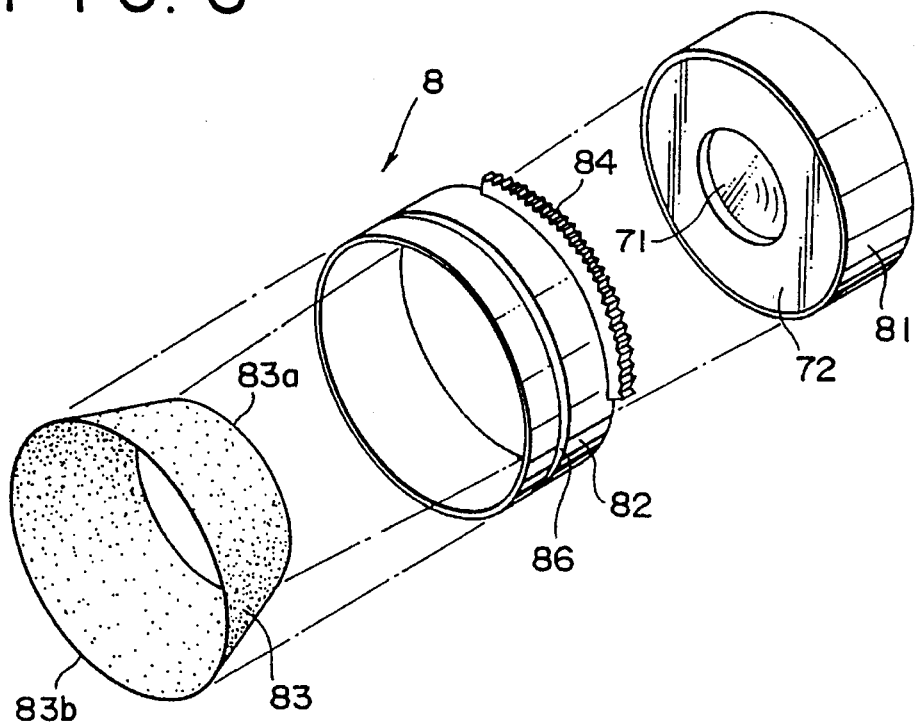
FIG. 6 is an exploded view of an aperture device according to one embodiment of the invention.

FIG. 5 is a perspective pre-assembled view of the second movable lens unit 7; FIG. 6 is an exploded view of an embodiment of a variable aperture device 8. The aperture device 8 is provided to the front portion of the second movable lens unit 7 (as shown in FIG. 4). As shown in FIG. 6, the aperture device 8 includes a fixed ring 81, an aperture driving ring 82, and a resilient opaque tube 83. The fixed ring 81 is fixed to the second movable lens frame 72, and the aperture driving ring 82 is rotatably supported about the fixed ring 81. A circumferential groove 86 is formed in the outer surface of the aperture driving ring 82 for engaging an L-shaped retaining flange 73 (shown in FIG. 4). The engagement of the circumferential groove 86 and the retaining flange 73 defines the axial position of the aperture driving ring 82. The aperture driving ring 82 is thereby rotatably supported by the second movable lens frame 72 (via the fixed ring 81), and its axial position is settable by means of the circumferential groove 86.

Figure 7:
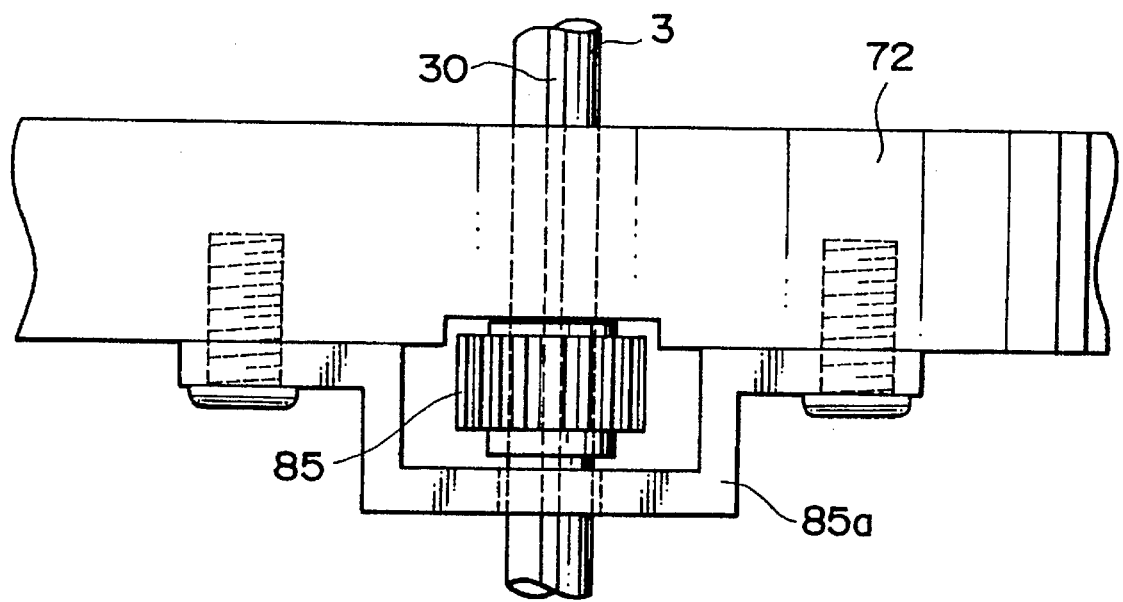
FIG. 7 is a side view of the mounting structure of the driving gear.

A sector gear 84 is formed on the periphery of the aperture driving ring 82, which will engage aperture driving gear 85 upon final assembly. The aperture driving gear 85 has an integral key on its inner surface for engaging the axial groove 30 of the guiding axis 3. The aperture driving gear 85 is longitudinally held to the second movable lens frame 72 by the holding member 85a, as shown in FIG. 7. Thus, the aperture driving gear 85 is slidable with the lens frame 72 along the guiding axis 3, and rotated via the integral key by the guiding axis 3. Accordingly, any rotation of the driven gear 4 is transmitted to the aperture driving ring 82 (After final assembly).

The resilient opaque tube 83 is made of a thin and resilient sheet material which blocks light, and which may be twisted repeatedly without damage (for example, a natural or synthetic rubber). The resilient opaque tube 83 is preferably shaped like a truncated conic tube, having a larger diameter rim 83b on the objective side and a smaller diameter rim 83a on the image side. According to this development, the control of the twisting of the tube via external members is more easily accomplished, and the tube suits the internal arrangements of lens systems particularly well, allowing the saving of internal space and assembly parts. The smaller diameter rim 83a of the resilient opaque tube 83 is the same diameter as that of the fixed ring 81, and is secured about the fixed ring 81. The larger diameter rim is secured about the front end (objective side) of the aperture driving ring 82. The axial length of the resilient opaque tube 83 is longer than the distance between the front end (objective side) of the aperture driving ring 82 and the front end (objective side) of the fixed ring 81, to allow for the twisting of the tube 83 to form a constricting iris at the largest set aperture (effective lens diameter) without undue stress. The length of the tube 83 is set depending on the effective lens diameter and the outer diameter of the movable lens frame 72. When the difference between these two diameters is large, the length of the resilient opaque tube 83 is lengthened. Accordingly, the resilient opaque tube 83, as it is twisted, is able to more easily fill the gap between the two diameters while remaining relatively free of stress. In this manner, the resilient opaque tube 83 can be arranged such that it does not begin to stretch until the constricting iris is formed, thereby placing the resilient material of the tube under less static and dynamic stretching loads.

An adhesive bond is used to secure the smaller diameter rim 83a to the fixed ring 81, and to secure the larger diameter rim 83b to the aperture driving ring 82. However, any method can be used for securing the rims 83a, 83b to the respective rings 81 and 82, so long as a light-proof joint is created and the opposite rims 83a, 83b remain secure when the resilient opaque tube 83 twists. For example, a holding ring can be used to hold the rims 83a, 83b of the resilient opaque tube 83.

The constriction of a circular iris 83c in an intermediate portion of the resilient opaque tube 83 is described by reference FIGS. 8(a) through 8(c) and 9(a) through 9(c). In FIGS. 8(a) through 8(c), and 9(a) through 9(c), surface lines are provided to enhance the illustration of the twisted angles of the surface of the resilient opaque tube 83. More specifically, the surface lines represent the surface of the opaque tube 83 between corresponding points along the smaller and larger diameter rims 83a, 83b. Corresponding points (one set shown in FIGS. 9(a) through 9(c) being L and L') align with each other along the optical axis when the opaque tube 83 is untwisted; that is, corresponding points define the shortest distance between rims 83a, 83b along the surface of the untwisted tube 83.

As shown in FIGS. 8(a) and 9(a), when the resilient opaque tube 83 is untwisted, the smaller diameter rim 83a defines the smallest overall internal diameter of the resilient opaque tube 83. As shown in FIGS. 8(b), 9(b), 8(c) and 9(c), as the resilient opaque tube 83 is twisted in the direction shown by the arrow T (that is, one of the rims 83a, 83b is rotated relative to the other), the shortest distance between corresponding points (those joined by the surface lines shown) is still a direct path, and the surface of the intermediate portion between the opposite rims 83a, 83b naturally follows this direct path. As shown in FIGS. 8(c) and 9(c), as the resilient opaque tube 83 is twisted further, a circular iris 83c is formed in the intermediate portion between the rims 83a, 83b, defining the smallest diameter of the resilient opaque tube 83 (smaller than that of the opening 83a). Thus, the circular iris can be controlled to maintain its shape, starting from a predetermined angular position and an established size, to a fully constricted position. When the resilient opaque tube 83 is twisted by at least 180 degrees, the circular iris 83c and aperture is fully closed (constricted).

The operation of the variable aperture device 8 as applied in the optical system 100 is described with reference to FIGS. 10(a) through 10(c). When the gear 4 (shown in FIG. 4) is rotated by a predetermined amount by the aperture driving mechanism (not shown), the guiding axis 3 and the driving gear 85 are driven, thereby driving the sector gear 84, and finally turning the aperture driving ring 82. The amount of rotation of the aperture driving ring 82 (i.e., the angular position) defines the aperture size as previously explained.

In this embodiment, the initial condition of the aperture device 8 (i.e., the aperture is "fully" open, for operational purposes) is set at a 90 degree twist of the resilient opaque tube 83, as shown in FIG. 10(a). In this initial condition, the constricted circular iris 83c between the opposite rims 83a, 83b of the resilient opaque tube 83 defines a diameter substantially the same as the second movable lens group 71. Thus, the initial condition defines a fully opened aperture. As the aperture driving ring 82 is rotated in the direction denoted by the arrow T, the twisted angle of the resilient opaque tube 83 approaches, for example, 120 degrees, and the aperture is further constricted, as shown in FIG. 10(b). When the aperture driving ring 82 is still further rotated so that the twisted angle becomes at least 180 degrees, the aperture closes as shown in FIG. 10(c). The axial position of the constricting circular iris 83c, defining the smallest internal diameter of the resilient opaque tube 83, is not changed during the aperture operation. Therefore, the constricting circular iris 83c can be maintained in a predetermined position appropriate for optimum lens design, that is, in a predetermined axial position with reference to the lens elements of the optical system 100. The constricting circular iris preferably acts as an aperture stop. Since some of these lens elements are movable along the optical axis, by reference to the lens elements, the predetermined axial position may also be movable (as is shown in the embodiment).

The described embodiment can be modified in several ways without departing from the essential scope and spirit of the invention. For example, as shown in FIGS. 11(a) through 11(c), the shape of the resilient opaque tube may be varied (the dashed line indicates the position where the circular iris 83c will form when the tubes 83, 83', and 83" are twisted. Particularly, FIG. 11(a) shows a truncated cone-shaped tube as previously described, FIG. 11(b) shows a combination of cylindrical and conic shapes bending at the iris-formation point, and FIG. 11(c) shows a tube shape formed as a rotated inward curve, similar to a hyperboloid, with the smallest diameter portion at the iris-formation point. Each of these shapes would function substantially as described. Again, alternatively, although the opposite ends of the resilient opaque tube 83 are of different diameter in the described embodiment, the ends can have the same diameter; that is, the resilient opaque tube 83 can be of cylindrical shape.

In another modification within the scope and spirit of the invention, even though the described embodiment incorporates an aperture driving ring 82 rotated by an external drive mechanism (the driving gear 85), the aperture device can be alternatively constructed such that the aperture driving ring 82 can be driven directly, by a driving mechanism borne by the fixed ring 81, or manually. Furthermore, a click mechanism can be provided to prevent the rotation of the aperture driving ring 82 caused by a resistant resilient force of the resilient opaque tube 83.

Still further, although the front rim (large diameter rim 83b) of the resilient opaque tube 83 is rotated by the aperture driving ring 82 in the described embodiment, the aperture device can be alternatively arranged so that the rear rim (small diameter rim 83a) is rotated, or such that both rims are simultaneously rotated in opposite directions. Still further, the present invention is not limited to the angular displacements described above to open and close the aperture. As would be understood by one of ordinary skill in the art, several ranges of angular displacement will achieve the same results, or different results based on the particular needs of the camera, without departing from either the scope or spirit of the invention.

Consequently, the aperture device 8 does not require a multiplicity of shutter blades, a cam disk, a driving disk, nor supports for each, the number of parts is thereby decreased and the assembling operation is simplified. The aperture device is compact in the direction of the optical axis even with few operating parts.

Furthermore, since the aperture produced by the twisting of the resilient opaque tube 83 is circular, formed by the constricting iris 83c, when the unsharp patches on an image appear in the shape of the aperture, the unsharp patches are circular. Since the resilient opaque tube 83 is slightly longer than the distance set between the front end of the aperture driving ring 82 and the fixed ring 81, when the resilient opaque tube 83 is twisted, the amount of deformation is relatively small, which prevents excessive wear and ensures a long lifetime.

The present disclosure relates to subject matter contained in Japanese Patent Application No. HEI 06-222750, filed on Aug. 25, 1994, which is expressly incorporated herein by reference in its entirety.

What is claimed is:

1. An aperture device for defining an aperture through which light can pass along an optical axis, comprising:

a resilient opaque tube supported coaxially with said optical axis;

means for constricting an intermediate portion of said resilient opaque tube by rotating at least a portion of said tube to form a circular aperture for controlling an amount of said light passing through said resilient opaque tube.

2. The aperture device according to claim 1, further comprising:

means for supporting front and rear rims of said resilient opaque tube; and means for twisting said resilient opaque tube to form and to constrict a circular iris between said front and rear rims of said resilient opaque tube.

3. The aperture device according to claim 2, wherein said supporting means comprises:

a first ring member secured to one of said front and rear rims of said resilient opaque tube; and a second ring member secured to a remaining one of said front and rear rims of said resilient tube, wherein said first and second ring member are arranged to rotate with respect to each other.

4. The aperture device according to the claim 3, wherein said first ring member is a non-rotatable ring member, and said second ring member is a rotatable ring member, rotatably supported and secured to said remaining one of said front and rear rims of said resilient opaque tube, and arranged to rotate with respect to said first ring member.

5. The aperture device according to claim 4, wherein said second ring member is concentrically mounted with respect to said first ring member.

6. The aperture device according to claim 5, wherein said second ring member is slidably rotatable about an outer circumferential surface of said first ring member.

7. The aperture device according to claim 3, wherein a relative rotational angle of said first ring member with respect to said second ring member is varied between first and second predetermined angles, and wherein said first predetermined angle defines a constricted circular iris corresponding to a largest circular aperture, said second predetermined angle defines a fully constricted iris corresponding to a fully closed aperture.

8. The aperture device according to claim 3, wherein an unstretched axial length of said resilient opaque tube in an untwisted state is longer than a distance between said first and second ring members.

9. The aperture device according to claim 2, wherein said front and rear rims have different diameter.

10. The aperture device according to claim 9, wherein said front rim has a larger diameter than said rear rim.

11. The aperture device according to claim 2, wherein a portion of said resilient opaque tube between said front and rear rims has a lesser diameter than said front and rear rims when said resilient opaque tube is untwisted.

12. The aperture device according to claim 11, wherein said resilient opaque tube has a shape of an inward curve rotated about an axis.

13. The aperture device according to claim 12, wherein said portion of lesser diameter of said resilient opaque tube is arranged in the same axial position in an untwisted state as an axial position at which said iris forms.

14. A lens unit through which light can pass along an optical axis, said lens unit comprising:

a lens frame including at least one lens;

a resilient opaque tube for forming and constricting a circular iris along said optical axis;

a non-rotatable ring provided to said lens frame for securing and supporting one of a rear rim and a front rim of said resilient opaque tube;

a rotatable ring, rotatably supported concentrically with said non-rotatable ring, for securing and supporting a remaining one of said front and rear rims of said resilient opaque tube; and means for rotating said rotatable ring, thereby twisting said resilient opaque tube to form and to constrict said circular iris between said front and rear rims of said resilient opaque tube, thereby defining a circular aperture, wherein said circular iris controls an amount of said light passing through said resilient opaque tube.

15. The aperture device according to the claim 14, wherein said rotatable ring member comprises a peripheral gear.

16. The lens unit according to claim 15, further comprising:

a driving gear engaging said peripheral gear of said rotatable ring member.

17. The lens unit according to claim 14, wherein said lens frame is axially movable within an optical system.

18. The lens unit according to claim 17, wherein said resilient opaque tube is axially movable in unison with said lens frame.

19. The lens unit according to claim 18, wherein said means for rotating said rotatable ring is axially movable in unison with said lens frame.

20. The lens unit according to claim 18, wherein said resilient opaque tube is arranged along said optical axis such that said circular iris is positioned with reference to said optical system to act as an aperture stop.

21. The lens unit according to the claim 14, wherein said rotatable ring is slidably mounted about said non-rotatable ring member.

* * * * *

UNITED STATES PATENT AND TRADEMARK OFFICE
CERTIFICATE OF CORRECTION

PATENT NO. : 5,589,906
DATED : December 31, 1996
INVENTOR(S) : Hitoshi SHIMIZU

It is certified that error appears in the above-indentified patent and that said Letters Patent is hereby corrected as shown below:

At column 8, line 22 (claim 9, line 2), change "diameter" to ---diameters---.

Signed and Sealed this

Eighth Day of April, 1997

Attest:

BRUCE LEHMAN

Attesting Officer     Commissioner of Patents and Trademarks